(12) United States Patent
Morris

(10) Patent No.: US 7,543,675 B2
(45) Date of Patent: Jun. 9, 2009

(54) METHOD AND APPARATUS FOR CONTROLLING SEAT POSITION BASED ON SEATBELT USAGE

(75) Inventor: Steven E. Morris, Fair Haven, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 356 days.

(21) Appl. No.: 11/459,649

(22) Filed: Jul. 25, 2006

(65) Prior Publication Data

US 2008/0023245 A1 Jan. 31, 2008

(51) Int. Cl.
*B60R 21/00* (2006.01)
(52) U.S. Cl. .................. 180/268; 180/271; 297/217.3
(58) Field of Classification Search ............ 180/268
See application file for complete search history.

(56) References Cited

U.S. PATENT DOCUMENTS

| | | | | |
|---|---|---|---|---|
| 4,136,328 A | * | 1/1979 | Cambern | 180/268 |
| 4,852,934 A | * | 8/1989 | Yasuda et al. | 296/64 |
| 4,997,053 A | * | 3/1991 | Drori et al. | 180/287 |
| 5,803,491 A | * | 9/1998 | Barnes et al. | 280/735 |
| 6,240,352 B1 | * | 5/2001 | McCurdy | 701/45 |
| 6,728,616 B1 | * | 4/2004 | Tabe | 701/45 |
| 6,997,279 B2 | | 2/2006 | Kolpasky et al. | |
| 7,002,457 B2 | | 2/2006 | Stevenson et al. | |
| 7,159,683 B2 | * | 1/2007 | Reitter | 180/268 |
| 7,383,911 B2 | * | 6/2008 | Schondorf et al. | 180/268 |

* cited by examiner

*Primary Examiner*—John Q. Nguyen
*Assistant Examiner*—Nicole Verley

(57) ABSTRACT

A method of controlling the position of a front seat having an unbelted rearmost position forward of a belted rearmost position within a vehicle is provided. The method includes determining if a seatbelt associated with the front seat is fastened and allowing movement of the front seat rearward of the unbelted rearmost position if the seatbelt is fastened. Alternately, movement of the front seat rearward of the unbelted rearmost position is prevented if the seatbelt is not fastened. The front seat may be either a driver seat or a passenger seat. A vehicle apparatus operable to carry out the disclosed method is also provided.

20 Claims, 2 Drawing Sheets

METHOD AND APPARATUS FOR CONTROLLING SEAT POSITION BASED ON SEATBELT USAGE

TECHNICAL FIELD

The present invention relates to a method and apparatus for controlling seat position within a vehicle based on the seatbelt usage of occupants within the vehicle.

BACKGROUND OF THE INVENTION

A typical prior art vehicle front seat, such as a driver seat or passenger seat, is typically made adjustable for the comfort of the occupant. Front seats may be limited in their range of fore and aft movement. The limited movement of the front seats in the rearward direction may affect the comfort of tall individuals when seated in the front seat.

SUMMARY OF THE INVENTION

A method of controlling the position of a front seat having an unbelted rearmost position forward of a belted rearmost position within a vehicle is provided. The method includes determining if a seatbelt associated with the front seat is fastened and allowing movement of the front seat rearward of the unbelted rearmost position if the seatbelt is fastened. Alternately, movement of the front seat rearward of the unbelted rearmost position is prevented if the seatbelt is not fastened.

The front seat may be one of a driver seat and a passenger seat. The method may further include determining if the passenger seat is occupied prior to determining if the seatbelt is fastened. Further, the method may include determining if the passenger seat is rearward of the unbelted rearmost position if the seatbelt is not fastened and moving the passenger seat to the unbelted rearmost position if the passenger seat is rearward of the unbelted rearmost position. Alternately, the method may include maintaining the position of the passenger seat and preventing movement of the passenger seat rearward of the unbelted rearmost position if the passenger seat is at, or forward of, the unbelted rearmost position.

If the front seat is a driver seat, the method may further include moving the driver seat to the rearmost belted position to facilitate entry into the vehicle prior to determining if the seatbelt is fastened. A determination may be made as to whether the seatbelt is fastened after actuating an ignition switch and before moving a transmission selector out of park. As a result, the driver seat may be moved to the furthest forward of a preselected seating position and the unbelted rearmost position if the seatbelt is unfastened or the driver seat may be moved to a preselected position at one of a position forward of, rearward of, and at the unbelted rearmost position if the seatbelt is fastened. Another determination may be made as to whether the seatbelt is fastened after moving the transmission selector out of park. If the seatbelt is not fastened and the driver seat is rearward of the unbelted rearmost position, an audible and/or visual warning is provided and the driver seat is moved to the unbelted rearmost position.

A vehicle is also provided having a front seat, such as a driver seat or a passenger seat, movably mounted and movable in a fore and aft direction with respect to the vehicle. A power drive mechanism is operable to move the front seat. A seatbelt assembly is also provided along with a seatbelt monitoring system operable to determine if the seatbelt assembly is fastened. The front seat has an unbelted rearmost position and a belted rearmost position disposed rearward of the unbelted rearmost position. A controller is operatively connected with the power drive mechanism and the seatbelt monitoring system. The controller is sufficiently programmed to establish whether the seatbelt is fastened from the seatbelt monitoring system and command the power drive system to move the front seat rearward of the unbelted rearmost position if the seatbelt is fastened and to move the front seat forward of the unbelted rearmost position if the seatbelt is not fastened. The present invention may enable certain passenger vehicles to pass the Federal Motor Vehicle Safety Standard (FMVSS) unbelted occupant test, while providing a comfortable seating position to tall individuals who are belted.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
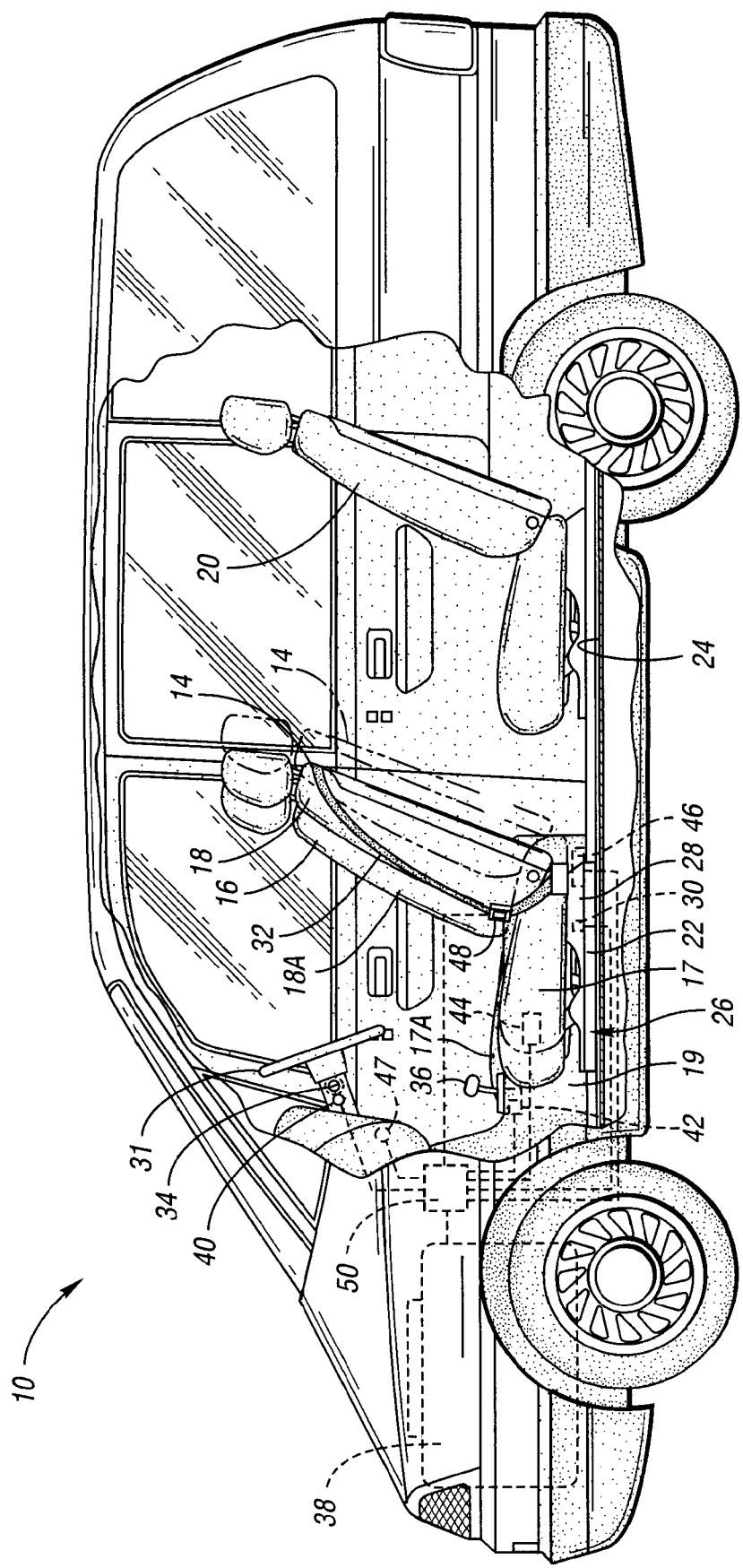
FIG. 1 is a partially cut away schematic side view of a vehicle having a fore and aft movable front seat mounted thereto and controlled by an electronic control unit in accordance with a method of the present invention.

Referring to FIG. 1, a vehicle 10 includes front seats, namely a front driver seat 14 and a front passenger seat 16, each including a lower seat portion 17 and 17A and a seatback portion 18 and 18A, respectively. Although the vehicle 10 is shown in FIG. 1 as a van-type vehicle, those skilled in the art will recognize that the present invention may be applied to other passenger vehicle configurations, such as cars, trucks, etc. A console 19 separates the front driver seat 14 and the front passenger seat 16. The vehicle 10 also includes a rear seat 20 located more rearwardly in the vehicle 10 than the seats 14 and 16. For the following discussion, it should be understood that the general construction and operation of the front passenger seat 16 are substantially similar to that of the front driver seat 14. Lower rails 22 are connected to a floor 24 of the vehicle 10 to form a seat track 26. Upper rails 28 are connected to the driver seat 14 and are slidably engaged with the lower rails 22. Those skilled in the art will recognize and understand a variety of seat track configurations that may be employed within the scope of the claimed invention.

The driver seat 14 is adjustable fore and aft, i.e., forward and rearward within the vehicle 10, by sliding the upper rails 28 along the lower rails 22. The adjustment of the driver seat 14 is preferably facilitated by a power drive mechanism 30. The driver seat 14 is depicted in a driving position in which the driver seat 14 is adjacent a steering wheel 31 and other controls such as foot pedals (not shown). The seating position of the driver seat 14, shown in FIG. 1 as solid lines, corresponds to a rearmost unbelted position. The rear most unbelted position corresponds to the rearmost position within the vehicle 10 that the driver seat 14 will be allowed to move if the occupant or driver is unbelted. The seating position of the driver seat 14, drawn in FIG. 1 with phantom lines, corresponds to a rearmost belted seating position. The rearmost belted seating position corresponds to the rearmost position within the vehicle 10 that the drive seat 14 will be allowed to move if the driver is belted. It should be understood that the terms belted and unbelted refers to conditions in which the driver of the vehicle 10 has his/her seat belt 32 fastened and unfastened, respectively. Additionally, it should be apparent from FIG. 1 that the rearmost belted seating position is located further rearward in the vehicle 10 than the rearmost unbelted position.

The vehicle 10 includes an ignition switch 34 and a transmission selector 36. The ignition switch 34 is switchable between an "on" position and an "off" position. The transmission selector 36 is moveable between a park position and various transmission operating modes, such as reverse, neutral, and drive. For the vehicle 10 to be in an operational mode, the ignition switch 34 must be in the "on" position and the transmission selector 36 must be in a position other than park. The vehicle 10 also includes a power plant 38, which provides motive force to propel the vehicle 10.

A sensor 40 is sufficiently configured and positioned with respect to the ignition switch 34 to detect the position or state of operation of the ignition switch 34. A sensor 42 is sufficiently configured and positioned with respect to the transmission selector 36 to detect the position or state of operation of the transmission selector 36. A sensor 44 is mounted with respect to the lower seat portion 17 and operates to determine whether the seat is occupied. Additionally, a sensor 46 is operable to determine the position of the driver seat 14 within the vehicle 10. An audible and/or visual warning system 47, such as a buzzer or light, is positioned within the vehicle 10 to receive signals from the controller 50.

A seatbelt monitoring system 48 is provided to determine the state of the seat belt 32, i.e., whether the occupant is belted or unbelted. The sensors 40, 42, 44, and 46 as well as the seatbelt monitoring system 48 are operatively connected to a controller 50. The controller 50 is programmed in accordance with the method illustrated in FIG. 2 to selectively limit the rearward-most position of the driver seat 14 and passenger seat 16 based on a plurality of conditions to be described in greater detail hereinbelow with reference to FIG. 2.

Figure 2:
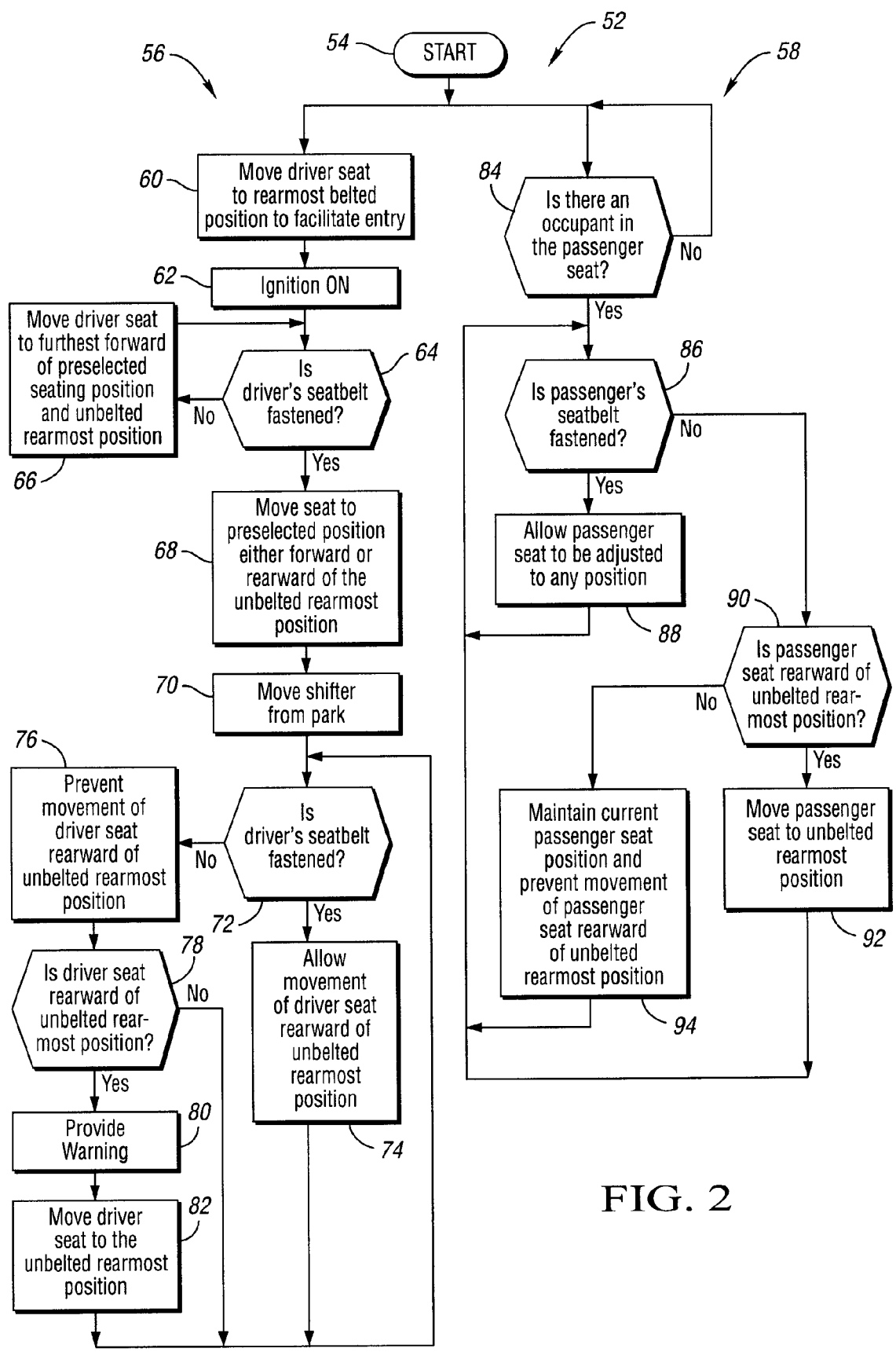
FIG. 2 is a method, presented in flowchart format, for controlling the position of the front seat as a function of seatbelt usage by the vehicle occupants.

Referring now to FIG. 2, and with continued reference to FIG. 1, there is shown a method 52 operable to selectively restrict or limit the movement of the driver and/or passenger seats 14 and 16 to the rearmost belted position if the occupant of the seat is unbelted. The method 52 begins at step 54 when a signal is provided to the controller 50 such as a keyless entry request to unlock the vehicle 10. The method 52 will then branch into a driver side branch 56 and a passenger side branch 58, each of which will be described separately hereinbelow. From step 54 the driver side branch 56 of the method 52 proceeds to step 60 where the controller 50 commands the power drive mechanism 30 to move the driver seat 14 to the rearmost belted position to facilitate entry of the driver into the vehicle 10. Once the driver is seated in the driver seat 14, the driver may actuate the ignition switch 34 to the "on" position as indicated by step 62. The sensor 40 will signal to the controller 50 that the ignition switch 34 has been switched to the "on" position. The method 52 will then proceed to step 64 where a determination is made as to whether the driver seatbelt 30 is fastened. The seatbelt monitoring system 48 will provide information to the controller 50 as to whether the seatbelt 30 is fastened. If the seatbelt 30 is not fastened, the method 52 proceeds to step 66.

At step 66, the driver seat 14 is moved either to a preselected position or to the unbelted rearmost position whichever is furthest forward in the vehicle 10. The preselected position may be stored within the controller 50 such that specific drivers may have stored seating positions, such systems are often referred to in the art as "memory seats". The step 66 then loops to step 64 to monitor the status of the seatbelt 30. If the seatbelt 30 is fastened, the method 52 proceeds from step 64 to step 68. At step 68, the driver seat 14 is moved to the preselected position. This preselected position may be fore or aft of the unbelted rearmost position, as such, the driver seat 14 may be moved rearward within the vehicle 10 until the belted rearmost position is reached. The method 52 then proceeds to step 70 where the driver places the transmission selector 36 in an out-of-park position, such as reverse, neutral, or drive. The sensor 42 will communicate to the controller 50 that the transmission selector is in an out-of-park mode of operation. The method 52 then proceeds to step 72.

At step 72, a determination is made as to whether the seatbelt 30 remains fastened. If the seatbelt remains fastened, the method 52 will proceed to step 74 where unrestricted movement of the driver seat 14 is allowed. The method 52 will loop to step 72 from step 74 to continuously monitor the status of the seatbelt 30. If, at step 72, it is determined that the seatbelt 30 is not fastened, the method 52 will proceed to step 76 where movement of the driver seat 14 rearward of the unbelted rearmost position is disallowed. The method 52 will then proceed from step 76 to step 78 where a determination is made as to whether the driver seat position is rearward of the unbelted rearmost position. If the driver seat 14 is not rearward of the unbelted rearmost position, then the method 52 loops to step 72 to continuously monitor the status of the seatbelt 30. Alternately, if the driver seat 14 is rearward of the unbelted rearmost position, the method 52 proceeds to step 80. At step 80, the warning system 47 provides the driver with an audible and/or visual indication of an impending adjustment to the driver seat 14. The driver seat 14 will then move to the unbelted rearmost position. Preferably, the driver seat 14 will be moved sufficiently slowly such that the movement is as imperceptible to the driver as possible. Subsequent to step 82, the method 52 will loop to step 72 to continuously monitor the status of the seatbelt 30.

Turning now to the passenger side branch 58 of the method 52, the method 52 will proceed from step 54 to step 84. At step 84, a determination is made as to whether an occupant or passenger is present in the passenger seat 16. This is accomplished thorough the use of the sensor 44. If the passenger seat 16 is not occupied, the method 52 will loop to step 54 to begin the passenger side branch 58 anew. If a passenger is seated in the passenger seat 16, the method 52 will proceed to step 86. At step 86, a determination is made as to whether the passenger seatbelt 30 is fastened. The seatbelt monitoring system 48 will provide information to the controller 50 as to whether the seatbelt 30 is fastened. If the seatbelt 30 is fastened, the method 52 proceeds to step 88. At step 88, the passenger seat 16 is allowed to move to any position either fore or aft of the unbelted rearmost position. That is, the passenger seat 16 may move rearward of the unbelted rearmost position until the passenger seat 16 reaches the belted rearmost position. The method 52 will then loop to step 86 to continuously monitor the status of the seatbelt 30. If, at step 86, a determination is made that the seatbelt 30 is not fastened, the method will proceed to step 90.

At step 90, a determination is made as to whether the position of the passenger seat 16 is rearward of the unbelted rearmost position. If the position of the passenger seat is rearward of the unbelted rearmost position, the method will proceed to step 92 where the controller 50 will command the passenger seat 16 to the unbelted rearmost position. As described hereinabove with reference to the driver seat 14, it is preferred that the movement of the passenger seat 16 to the unbelted rearmost position be accomplished slowly such that the movement of the passenger seat 16 is as imperceptible to the passenger as possible. The method will loop from step 92 to step 86 to continuously monitor the status of the seatbelt 30.

Referring back to step 90, if it is determined that the passenger seat 16 is not rearward of the unbelted rearmost position; the method 52 will proceed to step 94. At step 94, the position of the passenger seat 16 is maintained, while movement of the passenger seat 16 rearward of the unbelted rearmost position is prevented. From step 94, the method 52 loops to step 86 to continuously monitor the status of the seatbelt 30.

While the best modes for carrying out the invention have been described in detail, those familiar with the art to which this invention relates will recognize various alternative designs and embodiments for practicing the invention within the scope of the appended claims.

The invention claimed is:

1. A method of controlling the position of a front seat having an unbelted rearmost position forward of a belted rearmost position within a vehicle, the method comprising:
   determining if a seatbelt associated with the front seat is fastened before and after determining if a transmission selector of said vehicle has moved out of the park position;
   allowing movement of the front seat rearward of the unbelted rearmost position if the seatbelt is fastened; and
   preventing movement of the front seat rearward of the unbelted rearmost position if the seatbelt is not fastened;
   wherein said movement of the seat is controlled based upon said position of said transmission selector.

2. The method of claim 1, wherein the front seat is a passenger seat, the method further comprising determining if the passenger seat is occupied prior to determining if said seatbelt is fastened.

3. The method of claim 1, wherein the front seat is a passenger seat, the method further comprising:
   determining if the passenger seat is rearward of the unbelted rearmost position if said seatbelt is not fastened;
   moving the passenger seat to the unbelted rearmost position if the passenger seat is rearward of the unbelted rearmost position; and
   maintaining the position of the passenger seat and preventing movement of the passenger seat rearward of the unbelted rearmost position if the passenger seat is at, or forward of, the unbelted rearmost position.

4. The method of claim 1, wherein the front seat is a driver seat, the method further comprising moving the driver seat to the rearmost belted position to facilitate entry into the vehicle prior to determining if said seatbelt is fastened.

5. The method of claim 1, wherein the front seat is a driver seat, the method further comprising:
   determining if an ignition switch of said vehicle has been actuated; and
   wherein it is determined if said seatbelt is fastened after said ignition switch has been actuated and before said transmission selector has been moved out of the park position.

6. The method of claim 5, further comprising:
   moving the driver seat to the furthest forward of a preselected seating position and the unbelted rearmost position if said seatbelt is unfastened; and
   moving said driver seat to a preselected position at one of a position forward of, rearward of, and at the unbelted rearmost position if said seatbelt is fastened.

7. The method of claim 1, wherein the front seat is a driver seat, the method further comprising:
   determining if said transmission selector has been moved out of the park position;
   determining if said seatbelt is unfastened after said transmission selector has been moved out of the park position;
   determining if said driver seat is rearward of the unbelted rearmost position; and
   providing a warning.

8. The method of claim 7, further comprising moving the driver seat to the unbelted rearmost position if said seatbelt is not fastened.

9. The method of claim 8, further comprising:
   moving the driver seat to the furthest forward of a preselected seating position and the unbelted rearmost position if said seatbelt is not fastened.

10. The method of claim 7, wherein said warning is at least one of an audible warning and a visual warning.

11. A vehicle comprising:
    a front seat movably mounted and movable in a fore and aft direction with respect to the vehicle;
    a power drive mechanism operable to move said front seat;
    a seatbelt assembly;
    a seatbelt monitoring system operable to determine if said seatbelt assembly is fastened;
    wherein said front seat has an unbelted rearmost position and a belted rearmost position disposed rearward of said unbelted rearmost position;
    a controller operatively connected with said power drive mechanism and said seatbelt monitoring system;
    a transmission selector;
    a first sensor mounted with respect to said transmission selector and in communication with said controller; and
    wherein said first sensor is operable to determine the state of operation of said transmission selector;
    wherein said controller is sufficiently programmed to establish whether said seatbelt is fastened from said seatbelt monitoring system and command said power drive system to move said front seat rearward of said unbelted rearmost position if said seatbelt is fastened and to move said front seat forward of said unbelted rearmost position if said seatbelt is not fastened;
    wherein said movement of the seat is controlled based upon the state of operation of said transmission selector.

12. The vehicle of claim 11, wherein said front seat is one of a driver seat and a passenger seat.

13. The vehicle of claim 11, further comprising:
    a second sensor operatively connected to said controller; and
    wherein said second sensor is operable to determine the position of said front seat.

14. The vehicle of claim 11, farther comprising:
    a third sensor mounted with respect to said front seat and operatively connected to said controller;
    wherein said third sensor is operable to determine whether said front seat is occupied.

15. The vehicle of claim 11, further comprising:
    a warning system operable to indicate when said controller is commanding said power drive system to move said front seat; and
    wherein said warning system is at least one of a visual warning system and an audible warning system.

16. The vehicle of claim 11, further comprising:
    an ignition switch;
    a fourth sensor mounted with respect to said ignition switch and in communication with said controller; and wherein said fourth sensor is operable to determine the state of said ignition switch.

17. A method of controlling the position of a driver seat and a passenger seat each having an unbelted rearmost position forward of a belted rearmost position within a vehicle having a transmission selector and ignition switch, the method comprising:
- determining if a seatbelt associated with the driver seat is fastened;
- moving the driver seat to the furthest forward position of a preselected position and the unbelted rearmost position if said seatbelt associated with the driver seat is not fastened;
- moving the driver seat to said preselected position either forward or rearward of said unbelted rearmost position if said seatbelt associated with the driver seat is fastened;
- determining if the passenger seat is occupied;
- determining if a seatbelt associated with the passenger seat is fastened;
- allowing the passenger seat to be adjusted to any position if said seatbelt associated with the passenger seat is fastened;
- determining if the passenger seat is rearward of the unbelted rearmost position; and
- moving passenger seat to the unbelted rearmost position if the passenger seat position is rearward of the unbelted rearmost position.

18. The method of claim 17, further comprising maintaining the position of the passenger seat and preventing movement of the passenger seat rearward of the unbelted rearmost position if the passenger seat is forward of the unbelted rearmost position.

19. The method of claim 17, further comprising at least one of determining if the ignition switch has been actuated and determining if said transmission shifter has been moved from the park position prior to determining if said seatbelt associated with the driver seat is fastened.

20. The method of claim 17, further comprising providing at least one of a visual and audible warning prior to moving the driver seat to the unbelted rearmost position.

* * * * *